(12) United States Patent
Merrigan et al.

(10) Patent No.: US 10,752,710 B2
(45) Date of Patent: *Aug. 25, 2020

(54) PROCESS FOR THE PRODUCTION OF HIGH INTERNAL PHASE EMULSION FOAMS

(71) Applicant: The Procter & Gamble Company, Cincinnati, OH (US)

(72) Inventors: Steven Ray Merrigan, West Chester, OH (US); Thomas Allen Desmarais, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,906

(22) Filed: Oct. 18, 2018

(65) Prior Publication Data
US 2019/0048111 A1    Feb. 14, 2019

Related U.S. Application Data

(63) Continuation of application No. 14/713,427, filed on May 15, 2015, now Pat. No. 10,131,724, which is a
(Continued)

(51) Int. Cl.
| C08F 120/10 | (2006.01) |
| B29C 48/08 | (2019.01) |
| B29C 48/25 | (2019.01) |
| B29C 48/355 | (2019.01) |
| B29C 33/68 | (2006.01) |

(Continued)

(52) U.S. Cl.
CPC ............ *C08F 120/10* (2013.01); *B29C 33/68* (2013.01); *B29C 41/28* (2013.01); *B29C 44/28* (2013.01); *B29C 44/60* (2013.01); *B29C 48/08* (2019.02); *B29C 48/269* (2019.02); *B29C 48/355* (2019.02); *B29C 67/202* (2013.01);
(Continued)

(58) Field of Classification Search
CPC ................................ C08F 120/10; C08F 2/50
See application file for complete search history.

(56) References Cited

U.S. PATENT DOCUMENTS

| 3,807,124 A | 4/1974 | Kihnke |
| 3,854,864 A | 12/1974 | Mendoza |

(Continued)

FOREIGN PATENT DOCUMENTS

| GB | 1478987 A | 7/1977 |
| WO | WO-0050498 | 8/2000 |

OTHER PUBLICATIONS

Zhang, L., et al., "Photoinitiated Copolymerization of Acrylamide and Styrene in Oil-in-Water Microemulsion," Journal of Applied Polymer Science, vol. 66, pp. 2543-2549 (1997).
(Continued)

*Primary Examiner* — Shamim Ahmed
*Assistant Examiner* — Bradford M Gates
(74) *Attorney, Agent, or Firm* — William E. Gallagher

(57) ABSTRACT

A method for polymerizing an open-cell foam including exposing an emulsion comprising a photoinitiator to an Ultraviolet light source, partially polymerizing the top surface of the emulsion, and moving the partially polymerized emulsion to a second polymerization stage.

20 Claims, 5 Drawing Sheets

Related U.S. Application Data continuation of application No. 12/794,993, filed on Jun. 7, 2010, now Pat. No. 9,056,412.

(60) Provisional application No. 61/290,947, filed on Dec. 30, 2009.

(51) Int. Cl.
| | |
|---|---|
| *B29C 41/28* | (2006.01) |
| *B29C 44/28* | (2006.01) |
| *B29C 44/60* | (2006.01) |
| *B29C 67/20* | (2006.01) |
| *C08F 2/50* | (2006.01) |
| *B29K 105/04* | (2006.01) |

(52) U.S. Cl.
CPC ........ *C08F 2/50* (2013.01); *B29C 2948/9298* (2019.02); *B29K 2105/04* (2013.01); *C08J 2201/028* (2013.01)

(56) References Cited

U.S. PATENT DOCUMENTS

| | | | |
|---|---|---|---|
| 3,988,508 A | 10/1976 | Lissant | |
| 4,029,622 A | 6/1977 | Keller et al. | |
| 4,196,527 A | 4/1980 | Escande | |
| 4,308,667 A | 1/1982 | Roos et al. | |
| 4,378,278 A | 3/1983 | Allaway et al. | |
| 5,149,720 A | 9/1992 | Desmarais et al. | |
| 5,189,070 A | 2/1993 | Brownscombe et al. | |
| 5,210,104 A | 5/1993 | Bass et al. | |
| 5,252,619 A | 10/1993 | Brownscombe et al. | |
| 5,270,843 A | 12/1993 | Wang | |
| 5,290,820 A | 3/1994 | Brownscombe et al. | |
| 5,306,733 A | 4/1994 | Adamski et al. | |
| 5,306,734 A | 4/1994 | Bass et al. | |
| 5,306,831 A | 4/1994 | Beshouri et al. | |
| 5,334,621 A | 8/1994 | Beshouri | |
| 5,340,842 A | 8/1994 | Adamski et al. | |
| 5,358,974 A | 10/1994 | Brownscombe et al. | |
| 5,362,762 A | 11/1994 | Beshouri | |
| 5,394,738 A | 3/1995 | Bass et al. | |
| 5,634,281 A | 6/1997 | Nugent | |
| 5,646,193 A | 7/1997 | Brownscombe et al. | |
| 5,670,101 A | 9/1997 | Nathoo et al. | |
| 5,827,909 A | 10/1998 | Desmarais | |
| 5,912,276 A | 6/1999 | Adamski et al. | |
| 5,969,031 A | 10/1999 | Ruckenstein | |
| 6,057,376 A | 5/2000 | Bass et al. | |
| 6,103,645 A | 8/2000 | Chang et al. | |
| 6,166,097 A | 12/2000 | Yonemura et al. | |
| 6,274,638 B1 | 8/2001 | Yonemura et al. | |
| 6,323,250 B1 | 11/2001 | Kadonaga et al. | |
| 6,362,243 B1 | 3/2002 | Sasabe et al. | |
| 6,365,642 B1 | 4/2002 | Dyer et al. | |
| 6,395,792 B1 | 5/2002 | Nagasuna et al. | |
| 6,395,793 B1 | 5/2002 | Kadonaga et al. | |
| 6,525,106 B1 | 2/2003 | Desmarais et al. | |
| 6,573,305 B1 | 6/2003 | Thunhorst et al. | |
| 6,630,519 B2 | 10/2003 | Fujimaru et al. | |
| 6,649,665 B2 | 11/2003 | Kadonaga et al. | |
| 6,730,711 B2 | 5/2004 | Sasabe et al. | |
| 6,730,712 B2 | 5/2004 | Sasabe et al. | |
| 6,750,261 B1 | 6/2004 | Clear et al. | |
| 6,750,263 B2 | 6/2004 | Sasabe et al. | |
| 6,759,080 B2 | 7/2004 | Thunhorst et al. | |
| 6,765,029 B2 | 7/2004 | Sasabe et al. | |
| 6,797,735 B2 | 9/2004 | Nagasuna et al. | |
| 6,822,010 B2 | 11/2004 | Fujimaru et al. | |
| 6,846,439 B2 | 1/2005 | Kadonaga et al. | |
| 6,890,963 B2 | 5/2005 | Clear et al. | |
| 7,001,548 B2 | 2/2006 | Sakamoto et al. | |
| 7,304,312 B2 | 12/2007 | Hopaluk et al. | |
| 7,649,186 B2 | 1/2010 | Kabuki et al. | |
| 9,056,412 B2 * | 6/2015 | Merrigan | ................ B29C 33/68 |
| 10,131,724 B2 * | 11/2018 | Merrigan | ................ B29C 33/68 |
| 2006/0025521 A1 | 2/2006 | Frenz et al. | |
| 2007/0269747 A1 | 11/2007 | Bahadur et al. | |

OTHER PUBLICATIONS

Apen, "Polymeric Foam by Photoinitiated Polymerization of Trimethylolpropanetriacrylate: Initiate and Solvent Effects," Journal of Cellular Plastics, vol. 31, pp. 74-92 (1995).

Ghosh, S.K., et al., "Inverse Emulsion Polymerization of Acrylamide Using the Oil-Soluble Photoinitiator 2,2-Dimethoxy-2-Phenyl Acetophenone (DMPA)," Polymer Science: Recent Advances, vol. 2, pp. 9-14 (1994).

Apen, et al., "Bromaine-Containing Polymeric Foams," Journal of Cellular Plastics, vol. 28, pp. 557-570 (1992).

Stannett, V., et al., "Kinetics of the Radiation-Induced Polymerization of Styrene in Emulsion," Journal of Colloid and Interface Science, vol. 71, No. 1, pp. 130-140 (1979).

PCT International Search Report, PCT/US2010/061418, dated Apr. 4, 2011, 12 pages.

* cited by examiner

US 10,752,710 B2

PROCESS FOR THE PRODUCTION OF HIGH INTERNAL PHASE EMULSION FOAMS

CROSS REFERENCE TO RELATED APPLICATIONS

This application is a continuation of application Ser. No. 14/713,427, filed May 15, 2015, which is a continuation of application Ser. No. 12/794,993, filed Jun. 7, 2010, which claims the benefit of Provisional Application No. 61/290,947, filed Dec. 30, 2009, the substances of which are incorporated herein by reference.

FIELD OF THE INVENTION

This application relates to a process for reducing the surface adherence of High Internal Phase Emulsions (HIPEs) when produced in a continuous process.

BACKGROUND OF THE INVENTION

An emulsion is a dispersion of one liquid in another liquid and generally is in the form of a water-in-oil mixture having an aqueous or water phase dispersed within a substantially immiscible continuous oil phase. Water-in-oil (or oil in water) emulsions having a high ratio of dispersed aqueous phase to continuous oil phase are known in the art as High Internal Phase Emulsions, also referred to as "HIPE" or HIPEs. At relatively high dispersed aqueous phase to continuous oil phase ratios the continuous oil phase becomes essentially a thin film separating and coating the droplet-like structures of the internal, dispersed aqueous phase. In certain HIPEs continuous oil phase comprises one or more polymerizable monomers. These monomers can be polymerized, forming a cellular structure, for example a foam, having a cell size distribution defined by the size distribution of the dispersed, aqueous phase droplets.

HIPEs can be formed in a continuous process, wherein a HIPE is formed and then moved through the various stages used to produce a HIPE foam. A movable support member, such as a belt will typically be used to move a HIPE from one stage to the next. The initial polymerization of a HIPE comprises the initial 10-20% polymerization of the monomers present in the oil phase. Following the initial polymerization of the HIPE the next stage involves the bulk polymerization of the monomers present in the oil phase to produce a HIPE foam. The bulk polymerization stage lasts until 85 to 95% of the monomer has peen polymerized into a HIPE foam.

Initiator, which is used to start polymerization, is generally added during HIPE formation either to the separate aqueous and continuous oil phases or to the HIPE during the emulsion making process. In addition to the presence of initiator heat can be used to accelerate the polymerization reaction, for example the individual aqueous and oil phases may be heated to accelerate the polymerization reaction.

In a continuous process following HIPE formation, a HIPE can be moved to a curing oven, to complete polymerization. One type of curing oven has multiple levels or tiers with each tier having a belt running in the opposite direction from the belt above or below it. These multi-tiered curing ovens provide an enclosed heating environment and a large belt surface area in which to polymerize the HIPE monomers. Further, multi-tiered curing ovens take up very little floor space compared to horizontally designed curing ovens and are economic to run, in that the total volume is relatively small compared to the belt surface area so less energy has to be expended to heat the oven. The multiple tiers of the curing oven allow the top and bottom surfaces of a HIPE to be reversed from one level to another, such that as the HIPE progresses downwardly from tier to tier through the curing oven, the top surface of the HIPE (which is not in contact with belt surface) will be reversed on the belt of the next downward tier, so that the formerly top surface of the HIPE is now in contact with the belt at the next tier, such that the top surface of the HIPE is now the bottom surface. When the HIPE reaches the next level in the curing oven the HIPE surfaces will be reversed again. However, as the HIPE is not fully polymerized when it enters the multi-tiered curing oven the first couple of times the HIPE surfaces are reversed, parts of the HIPE surface that were in contact with the belt surface may adhere to the belt surface. These adherents on the belt surface then cause harmful defects, such as discoloration and reduction in the structural integrity, of the HIPE that subsequently come in to contact with the belt surface.

One potential solution to the problem of HIPEs adhering to the belt surface has been to increase the level of initiator in the HIPE or the temperature at which the HIPE is formed. However, both of these potential "fixes" have several drawbacks. First, both accelerate polymerization of the HIPE before the HIPE has been deposited on a belt, as initiator must be added before the HIPE is deposited so the HIPE will maintain some form upon contact with the belt, so as not to uncontrollably spread or cause deformations in the HIPE. The end result of accelerated polymerization during HIPE formation, either by additional initiator or heat, is that the polymerized portions of the HIPE clog whatever device is used to deposit the HIPE on to a belt, such as a die, leading to increased down time and increased costs. HIPEs can be polymerized in a continuous fashion by several different polymerization methods; such as thermal polymerization, radiation induced polymerization, and redox induced polymerization. While these methods can be used to polymerize HIPEs, there are limitations to their usefulness in all of the stages of HIPE polymerization. For example, HIPEs undergoing thermal polymerization are not optimized for an initial polymerization stage because they must be stable in the mixing process to avoid pre-polymerization in the mixing equipment, as such additional time is required for the initial polymerization.

Therefore, a method is needed is needed to prevent a HIPE surface from adhering to the belts of a multi-tiered curing oven, but which does not adversely affect other stages of HIPE formation.

SUMMARY OF THE INVENTION

A method for polymerizing an open-cell foam including exposing an emulsion comprising a photoinitiator to an Ultraviolet light source, partially polymerizing the top surface of the emulsion, and moving the partially polymerized emulsion to a second polymerization stage.

A method for polymerizing an open-cell foam including depositing an emulsion comprising a photoinitiator on an extrusion belt, exposing the emulsion to an Ultraviolet light source, partially polymerizing the top surface of the emulsion, and moving the partially polymerized emulsion to a second polymerization stage.

A method for polymerizing an open-cell foam including depositing a High Internal Phase Emulsion comprising a photoinitiator on an extrusion belt, exposing the High Internal Phase Emulsion to an Ultraviolet light source, partially polymerizing the top surface of the High Internal Phase Emulsion, and moving the partially polymerized High Internal Phase Emuslion to a second polymerization stage. The extrusion belt has at least one material from the group including films, non-woven materials, woven materials, and combinations thereof.

DETAILED DESCRIPTION OF THE INVENTION

Figure 1:
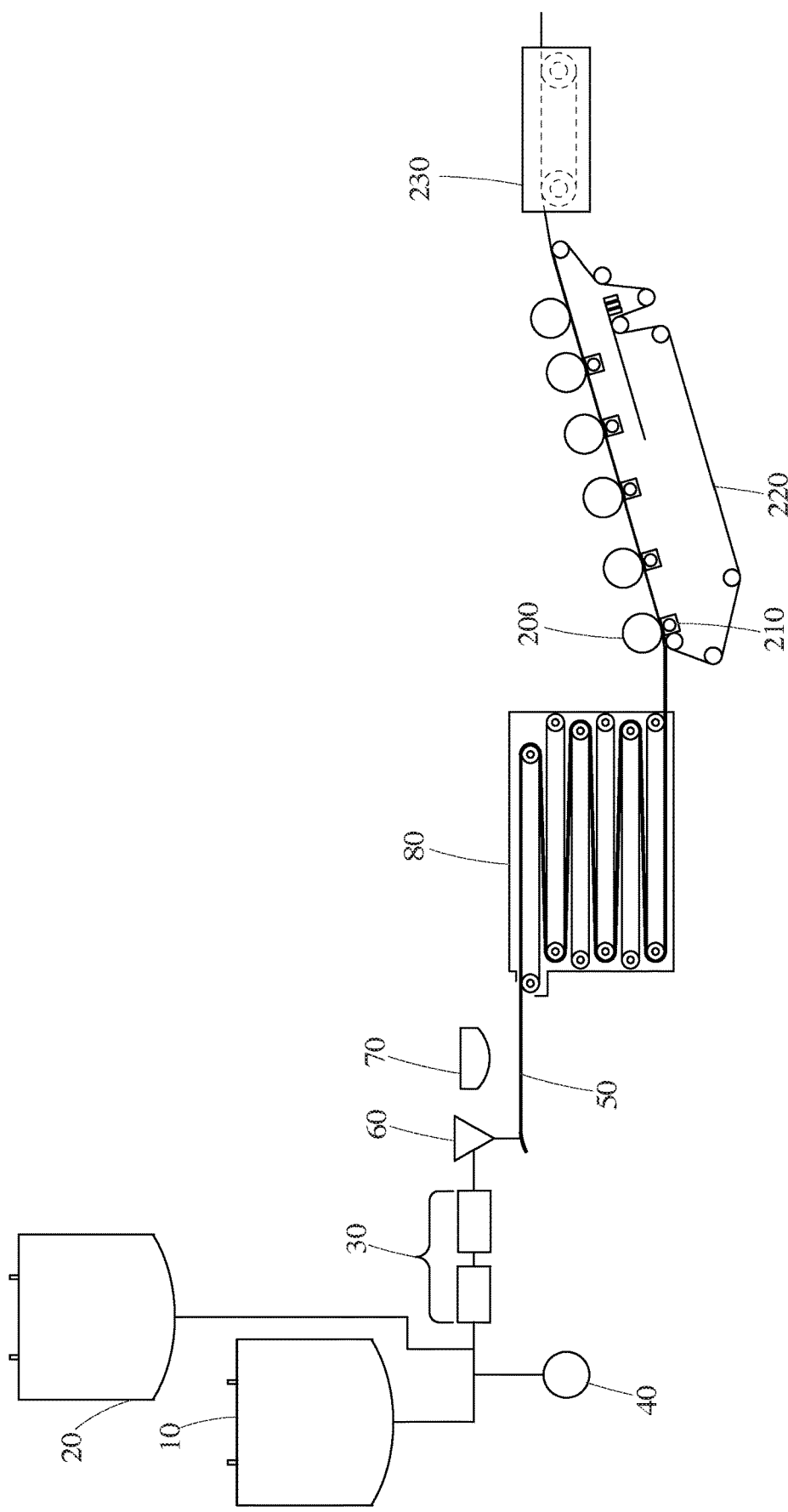
FIG. 1 is a process flow diagram of the present invention.

The present invention relates to a method for continuous HIPE foam production. The method reduces the adherence of a HIPE surface for the surface of a belt. In a continuous process for producing a HIPE foam, a HIPE is produced that comprises a dispersed aqueous phase and a continuous oil phase, which is then deposited on a belt, such as an endless belt. Following formation of the HIPE, but before the HIPE is moved to a curing oven the HIPE is exposed to an ultraviolet light source. The UV light from the UV light source polymerizes a portion of the monomers in the upper or top surface of the HIPE. The polymerization of the monomers in the top surface of the HIPE decreases the tendency of the HIPE top surface to adhere to the belt surface in a multi-tiered curing oven when the HIPE surfaces are reversed.

A High Internal Phase Emulsion (HIPE) comprises two phases. One phase is a continuous oil phase comprising monomers that are polymerized to form a HIPE foam and an emulsifier to help stabilize the HIPE. The oil phase may also include one or more photoinitiators. The monomer component, may be present in an amount of from about 80% to about 99%, and in certain embodiments from about 85% to about 95% by weight of the oil phase. The emulsifier component, which is soluble in the oil phase and suitable for forming a stable water-in-oil emulsion may be present in the oil phase in an amount of from about 1% to about 20% by weight of the oil phase. The emulsion may be formed at an emulsification temperature of from about 20° C. to about 130° C. and in certain embodiments from about 50° C. to about 100° C.

In general, the monomers will include from about 20% to about 97% by weight of the oil phase at least one substantially water-insoluble monofunctional alkyl acrylate or alkyl methacrylate. For example, monomers of this type may include $C_4$-$C_{18}$ alkyl acrylates and $C_2$-$C_{18}$ methacrylates, such as ethylhexyl acrylate, butyl acrylate, hexyl acrylate, octyl acrylate, nonyl acrylate, decyl acrylate, isodecyl acrylate, tetradecyl acrylate, benzyl acrylate, nonyl phenyl acrylate, hexyl methacrylate, 2-ethylhexyl methacrylate, octyl methacrylate, nonyl methacrylate, decyl methacrylate, isodecyl methacrylate, dodecyl methacrylate, tetradecyl methacrylate, and octadecyl methacrylate.

The oil phase may also comprise from about 2% to about 40%, and in certain embodiments from about 10% to about 30%, by weight of the oil phase, a substantially water-insoluble, polyfunctional crosslinking alkyl acrylate or methacrylate. This crosslinking comonomer, or crosslinker, is added to confer strength and resilience to the resulting HIPE foam. Examples of crosslinking monomers of this type comprise monomers containing two or more activated acrylate, methacrylate groups, or combinations thereof. Nonlimiting examples of this group include 1,6-hexanedioldiacrylate, 1,4-butanedioldimethacrylate, trimethylolpropane triacrylate, trimethylolpropane trimethacrylate, 1,12-dodecyldimethacrylate, 1,14-tetradecanedioldimethacrylate, ethylene glycol dimethacrylate, neopentyl glycol diacrylate (2,2-dimethylpropanediol diacrylate), hexanediol acrylate methacrylate, glucose pentaacrylate, sorbitan pentaacrylate, and the like. Other examples of crosslinkers contain a mixture of acrylate and methacrylate moieties, such as ethylene glycol acrylate-methacrylate and neopentyl glycol acrylate-methacrylate. The ratio of methacrylate:acrylate group in the mixed crosslinker may be varied from 50:50 to any other ratio as needed.

Any third substantially water-insoluble comonomer may be added to the oil phase in weight percentages of from about 0% to about 15% by weight of the oil phase, in certain embodiments from about 2% to about 8%, to modify properties of the HIPE foams. In certain cases, "toughening" monomers may be desired which impart toughness to the resulting HIPE foam. These include monomers such as styrene, vinyl chloride, vinylidene chloride, isoprene, and chloroprene. Without being bound by theory, it is believed that such monomers aid in stabilizing the HIPE during polymerization (also known as "curing") to provide a more homogeneous and better formed HIPE foam which results in better toughness, tensile strength, abrasion resistance, and the like. Monomers may also be added to confer flame retardancy as disclosed in U.S. Pat. No. 6,160,028 (Dyer) issued Dec. 12, 2000. Monomers may be added to confer color, for example vinyl ferrocene, fluorescent properties, radiation resistance, opacity to radiation, for example lead tetraacrylate, to disperse charge, to reflect incident infrared light, to absorb radio waves, to form a wettable surface on the HIPE foam struts, or for any other desired property in a HIPE foam. In some cases, these additional monomers may slow the overall process of conversion of HIPE to HIPE foam, the tradeoff being necessary if the desired property is to be conferred. Thus, such monomers can be used to slow down the polymerization rate of a HIPE. Examples of monomers of this type comprise styrene and vinyl chloride.

The oil phase may further contain an emulsifier used for stabilizing the HIPE. Emulsifiers used in a HIPE can include: (a) sorbitan monoesters of branched $C_{16}$-$C_{24}$ fatty acids; linear unsaturated $C_{16}$-$C_{22}$ fatty acids; and linear saturated $C_{12}$-$C_{14}$ fatty acids, such as sorbitan monooleate, sorbitan monomyristate, and sorbitan monoesters, sorbitan monolaurate diglycerol monooleate (DGMO), polyglycerol monoisostearate (PGMIS), and polyglycerol monomyristate (PGMM); (b) polyglycerol monoesters of -branched $C_{16}$-$C_{24}$ fatty acids, linear unsaturated $C_{16}$-$C_{22}$ fatty acids, or linear saturated $C_{12}$-$C_{14}$ fatty acids, such as diglycerol monooleate (for example diglycerol monoesters of C18:1 fatty acids), diglycerol monomyristate, diglycerol monoisostearate, and diglycerol monoesters; (c) diglycerol monoaliphatic ethers of -branched $C_{16}$-$C_{24}$ alcohols, linear unsaturated $C_{16}$-$C_{22}$ alcohols, and linear saturated $C_{12}$-$C_{14}$ alcohols, and mixtures of these emulsifiers. See U.S. Pat. No. 5,287,207 (Dyer et al.), issued Feb. 7, 1995 and U.S. Pat. No. 5,500,451 (Goldman et al.) issued Mar. 19, 1996. Another emulsifier that may be used is polyglycerol succinate (PGS), which is formed from an alkyl succinate, glycerol, and triglycerol.

Such emulsifiers, and combinations thereof, may be added to the oil phase so that they comprise between about 1% and about 20%, in certain embodiments from about 2% to about 15%, and in certain other embodiments from about 3% to about 12% by weight of the oil phase In certain embodiments, coemulsifiers may also be used to provide additional control of cell size, cell size distribution, and emulsion stability, particularly at higher temperatures, for example greater than about 65° C. Examples of coemulsifiers include phosphatidyl cholines and phosphatidyl choline-containing compositions, aliphatic betaines, long chain $C_{12}$-$C_{22}$ dialiphatic quaternary ammonium salts, short chain $C_1$-$C_4$ dialiphatic quaternary ammonium salts, long chain $C_{12}$-$C_{22}$ dialkoyl(alkenoyl)-2-hydroxyethyl, short chain $C_1$-$C_4$ dialiphatic quaternary ammonium salts, long chain $C_{12}$-$C_{22}$ dialiphatic imidazolinium quaternary ammonium salts, short chain $C_1$-$C_4$ dialiphatic imidazolinium quaternary ammonium salts, long chain $C_{12}$-$C_{22}$ monoaliphatic benzyl quaternary ammonium salts, long chain $C_{12}$-$C_{22}$ dialkoyl(alkenoyl)-2-aminoethyl, short chain $C_1$-$C_4$ monoaliphatic benzyl quaternary ammonium salts, short chain $C_1$-$C_4$ monohydroxyaliphatic quaternary ammonium salts. In certain embodiments, ditallow dimethyl ammonium methyl sulfate (DTDMAMS) may be used as a coemulsifier.

Photoinitiators may comprise between about 0.05% and about 10%, and in certain embodiments between about 0.2% and about 10% by weight of the oil phase. Lower amounts of photoinitiator allow light to better penetrate the HIPE foam, which can provide for polymerization deeper into the HIPE foam. However, if polymerization is done in an oxygen-containing environment, there should be enough photoinitiator to initiate the polymerization and overcome oxygen inhibition. Photoinitiators can respond rapidly and efficiently to a light source with the production of radicals, cations, and other species that are capable of initiating a polymerization reaction. The photoinitiators used in the present invention may absorb UV light at wavelengths of about 200 nanometers (nm) to about 800 nm, in certain embodiments about 250 nm to about 450 nm. If the photoinitiator is in the oil phase, suitable types of oil-soluble photoinitiators include benzyl ketals, α-hydroxyalkyl phenones, α-amino alkyl phenones, and acylphospine oxides. Examples of photoinitiators include 2,4,6-[trimethylbenzoyldiphosphine]oxide in combination with 2-hydroxy-2-methyl-1-phenylpropan-1-one (50:50 blend of the two is sold by Ciba Speciality Chemicals, Ludwigshafen, Germany as DAROCUR® 4265); benzyl dimethyl ketal (sold by Ciba Geigy as IRGACURE 651); α-,α-dimethoxy-α-hydroxy acetophenone (sold by Ciba Speciality Chemicals as DAROCUR® 1173); 2-methyl-1-[4-(methyl thio) phenyl]-2-morpholino-propan-1-one (sold by Ciba Speciality Chemicals as IRGACURE® 907); 1-hydroxycyclohexyl-phenyl ketone (sold by Ciba Speciality Chemicals as IRGACURE® 184); bis(2,4,6-trimethylbenzoyl)-phenylphosphineoxide (sold by Ciba Speciality Chemicals as IRGACURE 819); diethoxyacetophenone, and 4-(2-hydroxyethoxy)phenyl-(2-hydroxy-2-methylpropyl) ketone (sold by Ciba Speciality Chemicals as IRGACURE® 2959); and Oligo [2-hydroxy-2-methyl-1-[4-(1-methylvinyl) phenyl]propanone] (sold by Lamberti spa, Gallarate, Italy as ESACURE® KIP EM.

The dispersed aqueous phase of a HIPE comprises water, and may also comprise one or more components, such as initiator, photoinitiator, or electrolyte, wherein in certain embodiments, the one or more components are at least partially water soluble.

One component of the aqueous phase may be a water-soluble electrolyte. The water phase may contain from about 0.2% to about 40%, in certain embodiments from about 2% to about 20%, by weight of the aqueous phase of a water-soluble electrolyte. The electrolyte minimizes the tendency of monomers, comonomers, and crosslinkers that are primarily oil soluble to also dissolve in the aqueous phase. Examples of electrolytes include chlorides or sulfates of alkaline earth metals such as calcium or magnesium and chlorides or sulfates of alkali earth metals such as sodium. Such electrolyte can include a buffering agent for the control of pH during the polymerization, including such inorganic counterions as phosphate, borate, and carbonate, and mixtures thereof. Water soluble monomers may also be used in the aqueous phase, examples being acrylic acid and vinyl acetate.

Another component that may be present in the aqueous phase is a water-soluble free-radical initiator. The initiator can be present at up to about 20 mole percent based on the total moles of polymerizable monomers present in the oil phase. In certain embodiments, the initiator is present in an amount of from about 0.001 to about 10 mole percent based on the total moles of polymerizable monomers in the oil phase. Suitable initiators include ammonium persulfate, sodium persulfate, potassium persulfate, 2,2'-azobis(N,N'-dimethyleneisobutyramidine)dihydrochloride, azo initiators, redox couples like persulfate-bisulfite, persulfate-ascorbic acid, and other suitable redox initiators. In certain embodiments, to reduce the potential for premature polymerization which may clog the emulsification system, addition of the initiator to the monomer phase may be just after or near the end of emulsification.

Photoinitiators present in the aqueous phase may be at least partially water soluble and may comprise between about 0.05% and about 10%, and in certain embodiments between about 0.2% and about 10% by weight of the oil phase. Lower amounts of photoinitiator allow light to better penetrate the HIPE foam, which can provide for polymerization deeper into the HIPE foam. However, if polymerization is done in an oxygen-containing environment, there should be enough photoinitiator to initiate the polymerization and overcome oxygen inhibition. Photoinitiators can respond rapidly and efficiently to a light source with the production of radicals, cations, and other species that are capable of initiating a polymerization reaction. The photoinitiators used in the present invention may absorb UV light at wavelengths of from about 200 nanometers (nm) to about 800 nm, in certain embodiments from about 200 nm to about 350 nm, and in certain embodiments from about 350 nm to about 450 nm. If the photoinitiator is in the aqueous phase, suitable types of water-soluble photoinitiators include benzophenones, benzils, and thioxanthones. Examples of photoinitiators include 2,2'-Azobis[2-(2-imidazolin-2-yl)propane]dihydrochloride; 2,2'-Azobis[2-(2-imidazolin-2-yl)propane]disulfate dehydrate; 2,2'-Azobis(1-imino-1-pyrrolidino-2-ethylpropane)dihydrochloride; 2,2'-Azobis[2-methyl-N-(2-hydroxyethyl)propionamide]; 2,2'-Azobis(2-methylpropionamidine)dihydrochloride; 2,2'-dicarboxymethoxydibenzalacetone, 4,4'-dicarboxymethoxydibenzalacetone, 4,4'-dicarboxy methoxy dibenzalcy clohexanone, 4-dimethylamino-4'-carboxymethoxy dibenzalacetone; and 4,4'-disulphoxymethoxydibenzalacetone. Other suitable photoinitiators that can be used in the present invention are listed in U.S. Pat. No. 4,824,765 (Sperry et al.) issued Apr. 25, 1989.

In addition to the previously described components other components may be included in either the aqueous or oil phase of a HIPE. Examples include antioxidants, for example hindered phenolics, hindered amine light stabilizers; plasticizers, for example dioctyl phthalate, dinonyl sebacate; flame retardants, for example halogenated hydrocarbons, phosphates, borates, inorganic salts such as antimony trioxide or ammonium phosphate or magnesium hydroxide; dyes and pigments; fluorescers; filler particles, for example starch, titanium dioxide, carbon black, or calcium carbonate; fibers; chain transfer agents; odor absorbers, for example activated carbon particulates; dissolved polymers; dissolved oliogomers; and the like.

HIPE foam is produced from the polymerization of the monomers comprising the continuous oil phase of a HIPE. In certain embodiments, HIPE foams may have one or more layers, and may be either homogeneous or heterogeneous polymeric open-celled foams. Homogeneity and heterogeneity relate to distinct layers within the same HIPE foam, which are similar in the case of homogeneous HIPE foams or which differ in the case of heterogeneous HIPE foams. A heterogeneous HIPE foam may contain at least two distinct layers that differ with regard to their chemical composition, physical properties, or both; for example layers may differ with regard to one or more of foam density, polymer composition, specific surface area, or pore size (also referred to as cell size). For example, for a HIPE foam if the difference relates to pore size, the average pore size in each layer may differ by at least about 20%, in certain embodiments by at least about 35%, and in still other embodiments by at least about 50%. In another example, if the differences in the layers of a HIPE foam relate to density, the densities of the layers may differ by at least about 20%, in certain embodiments by at least about 35%, and in still other embodiments by at least about 50%. For instance, if one layer of a HIPE foam has a density of 0.020 g/cc, another layer may have a density of at least about 0.024 g/cc or less than about 0.016 g/cc, in certain embodiments at least about 0.027 g/cc or less than about 0.013 g/cc, and in still other embodiments at least about 0.030 g/cc or less than about 0.010 g/cc. If the differences between the layers are related to the chemical composition of the HIPE or HIPE foam, the differences may reflect a relative amount difference in at least one monomer component, for example by at least about 20%, in certain embodiments by at least about 35%, and in still further embodiments by at least about 50%. For instance, if one layer of a HIPE or HIPE foam is composed of about 10% styrene in its formulation, another layer of the HIPE or HIPE foam may be composed of at least about 12%, and in certain embodiments of at least about 15%.

A HIPE foam having separate layers formed from differing HIPEs, as explained in more detail below, provides a HIPE foam with a range of desired performance characteristics. For example, a HIPE foam comprising a first and second foam layer, wherein the first foam layer has a relatively larger pore or cell size, than the second layer, when used in an absorbent article may more quickly absorb incoming fluids than the second layer. By way of example when used in an absorbent articled the first foam layer may be layered over the second foam layer having relatively smaller pore sizes, as compared to the first foam layer, which exert more capillary pressure and drain the acquired fluid from the first foam layer, restoring the first foam layer's ability to acquire more fluid. HIPE foam pore sizes may range from 1 to 200 µm and in certain embodiments may be less than 100 µm. HIPE foams of the present invention having two major parallel surfaces may be from about 0.5 to about 10 mm thick, and in certain embodiments from about 2 to about 10 mm. The desired thickness of a HIPE will depend on the materials used to form the HIPE, the speed at which a HIPE is deposited on a belt, and the intended use of the resulting HIPE foam.

The HIPE foams of the present invention are relatively open-celled. This refers to the individual cells or pores of the HIPE foam being in substantially unobstructed communication with adjoining cells. The cells in such substantially open-celled HIPE foam structures have intercellular openings or windows that are large enough to permit ready fluid transfer from one cell to another within the HIPE foam structure. For purpose of the present invention, a HIPE foam is considered "open-celled" if at least about 80% of the cells in the HIPE foam that are at least 1 µm in size are in fluid communication with at least one adjoining cell.

In addition to being open-celled, in certain embodiments HIPE foams are sufficiently hydrophilic to permit the HIPE foam to absorb aqueous fluids, for example the internal surfaces of a HIPE foam may be rendered hydrophilic by residual hydrophilizing surfactants or salts left in the HIPE foam following polymerization, by selected post-polymerization HIPE foam treatment procedures (as described hereafter), or combinations of both.

In certain embodiments, for example when used in certain absorbent articles, a HIPE foam may be flexible and exhibit an appropriate glass transition temperature (Tg). The Tg represents the midpoint of the transition between the glassy and rubbery states of the polymer. In general, HIPE foams that have a higher Tg than the temperature of use can be very strong but will also be very rigid and potentially prone to fracture. In certain embodiments, regions of the HIPE foams of the current invention which exhibit either a relatively high Tg or excessive brittleness will be discontinuous. Since these discontinuous regions will also generally exhibit high strength, they can be prepared at lower densities without compromising the overall strength of the HIPE foam.

HIPE foams intended for applications requiring flexibility should contain at least one continuous region having a Tg as low as possible, so long as the overall HIPE foam has acceptable strength at in-use temperatures. In certain embodiments, the Tg of this region will be less than about 40° C. for foams used at about ambient temperature conditions, in certain other embodiments less than about 30° C. For HIPE foams used in applications wherein the use temperature is higher or lower than ambient, the Tg of the continuous region may be no more that 10° C. greater than the use temperature, in certain embodiments the same as use temperature, and in further embodiments about 10° C. less than use temperature wherein flexibility is desired. Accordingly, monomers are selected as much as possible that provide corresponding polymers having lower Tg's.

The HIPE foams of the present invention may be used as absorbent core materials in absorbent articles, such as feminine hygiene articles, for example pads, pantiliners, and tampons; disposable diapers; incontinence articles, for example pads, adult diapers; homecare articles, for example wipes, pads, towels; and beauty care articles, for example pads, wipes, and skin care articles, such as used for pore cleaning.

To produce a HIPE using the above, and shown in FIG. 1, an aqueous phase 10 and an oil phase are combined in a ratio between about 8:1 and 140:1. In certain embodiments, the aqueous phase to oil phase ratio is between about 10:1 and about 75:1, and in certain other embodiments the aqueous phase to oil phase ratio is between about 13:1 and about 65:1. This is termed the "water-to-oil" or W:O ratio and can be used to determine the density of the resulting HIPE foam. As discussed, the oil phase may contain one or more of monomers, comonomers, photoinitiators, crosslinkers, and emulsifiers, as well as optional components. The water phase will contain water and in certain embodiments one or more components such as electrolyte, initiator, or optional components.

The HIPE can be formed from the combined aqueous 10 and oil 20 phases by subjecting these combined phases to shear agitation in a mixing chamber or mixing zone 30. The combined aqueous 10 and oil 20 phases are subjected to shear agitation produce a stable HIPE having aqueous droplets of the desired size. An initiator may be present in the aqueous phase, or as shown in FIG. 1 an initiator 40 may be introduced during the HIPE making process, and in certain embodiments, after the HIPE has been formed but before the HIPE has been deposited on an extrusion belt 50. The emulsion making process produces a HIPE where the aqueous phase droplets are dispersed to such an extent that the resulting HIPE foam will have the desired structural characteristics. Emulsification of the aqueous 10 and oil 20 phase combination in the mixing zone 30 may involve the use of a mixing or agitation device such as an impeller, by passing the combined aqueous and oil phases through a series of static mixers at a rate necessary to impart the requisite shear, or combinations of both. Once formed, the HIPE can then be withdrawn or pumped from the mixing zone 30. One method for forming HIPEs using a continuous process is described in U.S. Pat. No. 5,149,720 (DesMarais et al), issued Sep. 22, 1992 and U.S. Pat. No. 5,827,909 (DesMarais) issued on Oct. 27, 1998.

Figure 2:
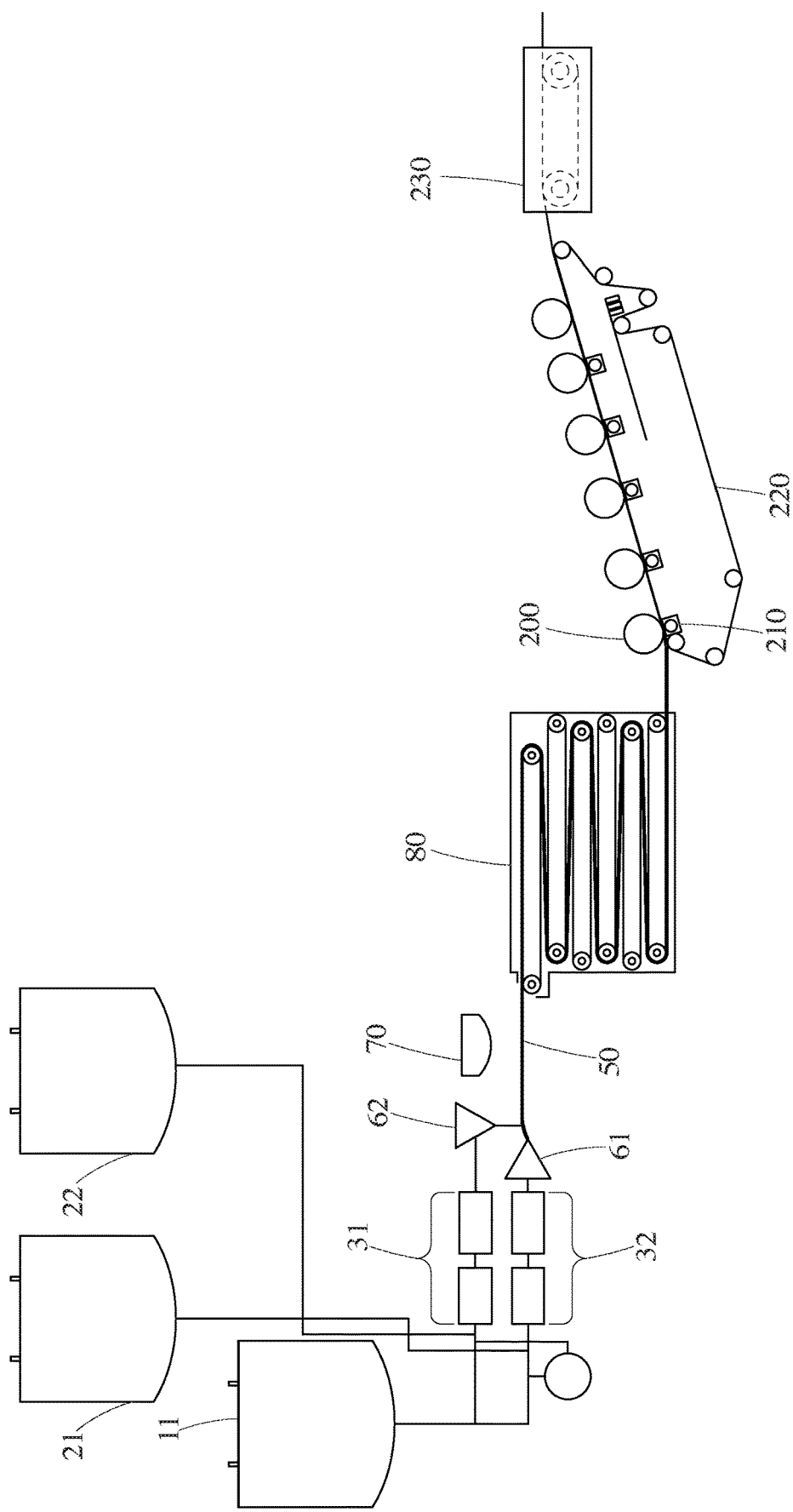
FIG. 2 is a process flow diagram of the present invention.

In certain embodiments for a continuous process the HIPE can be withdrawn or pumped from the mixing zone 30 and deposited on to an extrusion belt 50 travelling in a substantially horizontal direction. The HIPE may be deposited on to the extrusion belt 50 through one or more depositing devices 60 such as a die, sprayer, or caster. In certain embodiments a HIPE is deposited in a substantially even thickness across the width of the extrusion belt 50 to form a sheet-like material. As shown in FIG. 2, in the present invention two or more distinct HIPEs can be produced, which after polymerization will form two or more distinct layers in a HIPE foam, for example a first HIPE and a second HIPE, wherein each HIPE may have an individual composition (aqueous and oil phases) or individual combinations of properties, for example pore dimensions, mechanical properties, and the like, that differs from the other HIPEs. The individual HIPEs can be formed from one or more individual oil phases and one or more individual aqueous phases, and combinations thereof. For example, individual HIPEs can be formed from a single oil phase combined with 2 or more different aqueous phases, or as shown in FIG. 2 a single aqueous phase 11 combined with 2 or more individual oil phases 21, 22.

The individual aqueous 11 and oil phases 21, 22 enter separate mixing zones 31 and 32 and then are deposited the same way as individual HIPEs. For example, in a continuous process of the present invention a first die 61 can deposit one HIPE layer on to extrusion belt 50 then the same die or a second die 62, as shown in FIG. 2, could deposit a second HIPE on top of the first HIPE. In another embodiment using the previously described continuous method a die could deposit HIPEs adjacently on to a belt where the individual HIPEs may or may not overlap each other, or any other means of moving one or more HIPEs from a mixing zone to produce a HIPE foam.

Examples of belts that may be used in the present invention, such as extrusion belts or as explained below curing oven belts, may be made of one or more metals, a resin, or combinations thereof; or sheet materials such as films that may be positioned on the belt and moving therewith. The average thickness of a HIPE, as measured from the surface of the HIPE that is in contact with the belt to the opposing HIPE surface, can be adjusted by the movement speed of the belt, the flow of HIPE deposited on the belt, or the configuration of one or more depositing devices used to deposit the HIPE on a belt.

A belt can be any thickness or shape suitable for producing a HIPE foam. Further, the surface of a belt, can be substantially smooth or may comprise depressions, protuberances, or combinations thereof. The protuberances or depressions may be arranged in any formation or order and can be used to provide patterns, designs, markings or the like to HIPE foam. The belt may comprise one or more materials suitable for the polymerization conditions (various properties such as heat resistance, weatherability, surface energy, abrasion resistance, recycling property, tensile strength and other mechanical strengths) and may comprise at least one material from the group including films, non-woven materials, woven materials, and combinations thereof. Examples of films include, fluorine resins such as polytetrafluoroethylene, tetrafluoroethylene-perfluoroalkylvinyl ether copolymers, tetrafluoroethylene-hexafluoropropylene copolymers, and tetrafluoroethylene-ethylene copolymers; silicone resins such as dimethyl polysiloxane and dimethylsiloxane-diphenyl siloxane copolymers; heat-resistant resins such as polyimides, polyphenylene sulfides, polysulfones, polyether sulfones, polyether imides, polyether ether ketones, and para type aramid resins; thermoplastic polyester resins such as polyethylene terephthalates, polybutylene terephthalates, polyethylene naphthalates, polybutylene naphthalates, and polycyclohexane terephthalates, thermoplastic polyester type elastomer resins such as block copolymers (polyether type) formed of PBT and polytetramethylene oxide glycol and block copolymers (polyester type) formed of PBT and polycaprolactone may be used. These materials may be used either singly or in mixed form of two or more materials. Further, the belt may be a laminate comprising two or more different materials or two or more materials of the same composition, but which differ in one or more physical characteristics, such as quality or thickness.

After a HIPE has been deposited on the extrusion belt 50, the extrusion belt 50 moves the HIPE to an Ultraviolet (UV) light zone 70 containing one or more sources of UV light. Exposure of the HIPE containing unpolymerized monomers, and in certain embodiments, one or more photoinitiators to the UV light zone 70 initiates the initial polymerization of monomers in the oil phase of the HIPE. Examples of sources of UV light are UV lamps. There may be one or more sources of UV light used to polymerize the HIPE monomers. The sources may be the same or differ. For example, the sources may differ in the wavelength of the UV light they produce or in the amount of time a HIPE is exposed to the UV light source. The UV light wavelength in the range from about 200 to about 800 nm, and in certain embodiments from about 250 nm to 450 nm, overlaps to at least some degree with the UV light absorption band of the photoinitiator and is of sufficient intensity and exposure duration to polymerize enough monomers in the HIPE to reduce the adherence of the HIPE for a belt surface. The radiation should also be of sufficient intensity to reduce the adherence of the HIPE foam to itself when wound up.

Figure 3:
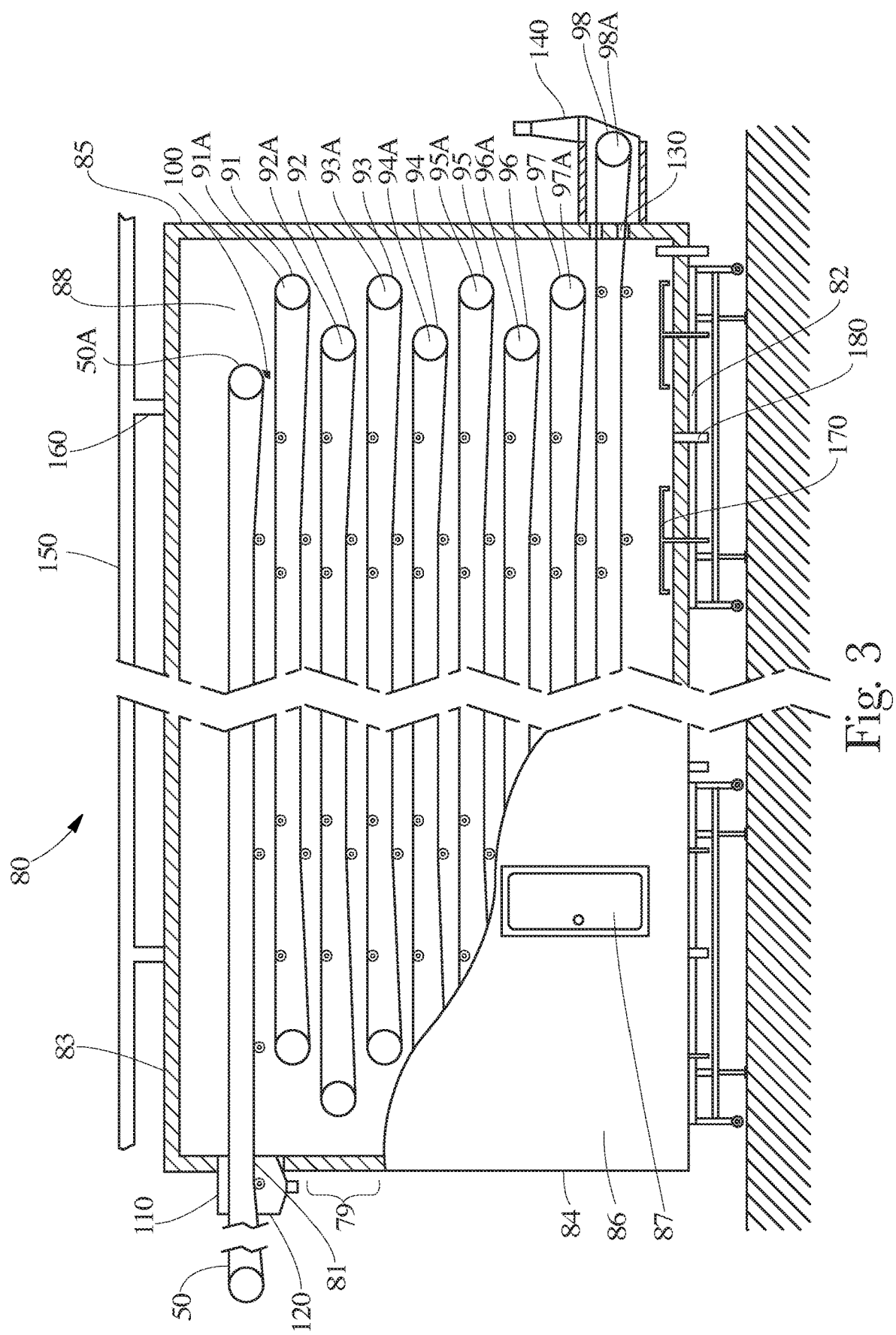
FIG. 3 is a cut-away schematic view of a multi-tiered curing oven.

Following the UV light zone 70, the extrusion belt 50 moves the HIPE into a multi-tiered curing oven 80 to polymerize the HIPE into a HIPE foam. An example of a multi-tiered curing 80 oven that can be used in the present invention is shown in FIG. 3. The multi-tiered curing oven 80, wherein each tier 79 comprises at least one belt, has a volume defined by a housing having a floor 82, a top 83, end walls 84, 85, a front wall 86 comprised of a plurality of removable front access panels 87 which allow for cleaning and servicing of the internal components of the multi-tiered curing oven 80, such as belts and drive pulleys, and a back wall 88. The exterior walls 82, 84, 85, 86, 88 and top 83 of the multi-tiered curing oven 80 may be insulated with a conventional insulating material.

The multi-tiered curing oven 80 in FIG. 3 is shown with nine belts-extrusion belt 50, a first oven belt oven belt 91, a second oven belt 92, and so on 93, 94, 95, 96, 97 and the discharge belt 98; however the multi-tiered curing oven 80 can have any number of belts useful for the polymerization of a HIPE. The belts 50, 91, 92, 93, 94, 95, 96, 97, 98 are disposed in a superposed staggered relationship, allowing the HIPE to be transferred downwardly successively from belt to belt, and finally to the discharge belt 98. This relationship of the belts 50, 91, 92, 93, 94, 95, 96, 97, 98 allows the HIPE to spend more time in the curing oven without substantial horizontal movement, decreasing the required floor space, oven size, and reducing the cost of HIPE polymerization, as compared to standard curing ovens having a single belt. Extrusion belt 50, discharge belt 98, and oven belts 92, 94 and 96 are driven in the same direction and belts 91, 93, 95 and 97 are driven in a direction countercurrent to the extrusion belt 50, discharge belt 98, and oven belts 92, 94 and 96. The belts 50, 91, 92, 93, 94, 95, 96, 97, 98 are each driven by a drive pulley 50A, 91A, 92A, 93A, 94A, 95A, 96A, 97A, 98A, respectively, which are powered by a variable speed electric motor. A variable speed electric motor is used so that the speed of each of the belts can be individually controlled. The belts used in the multi-tiered curing oven comprise the same materials as listed previously.

Figure 4:
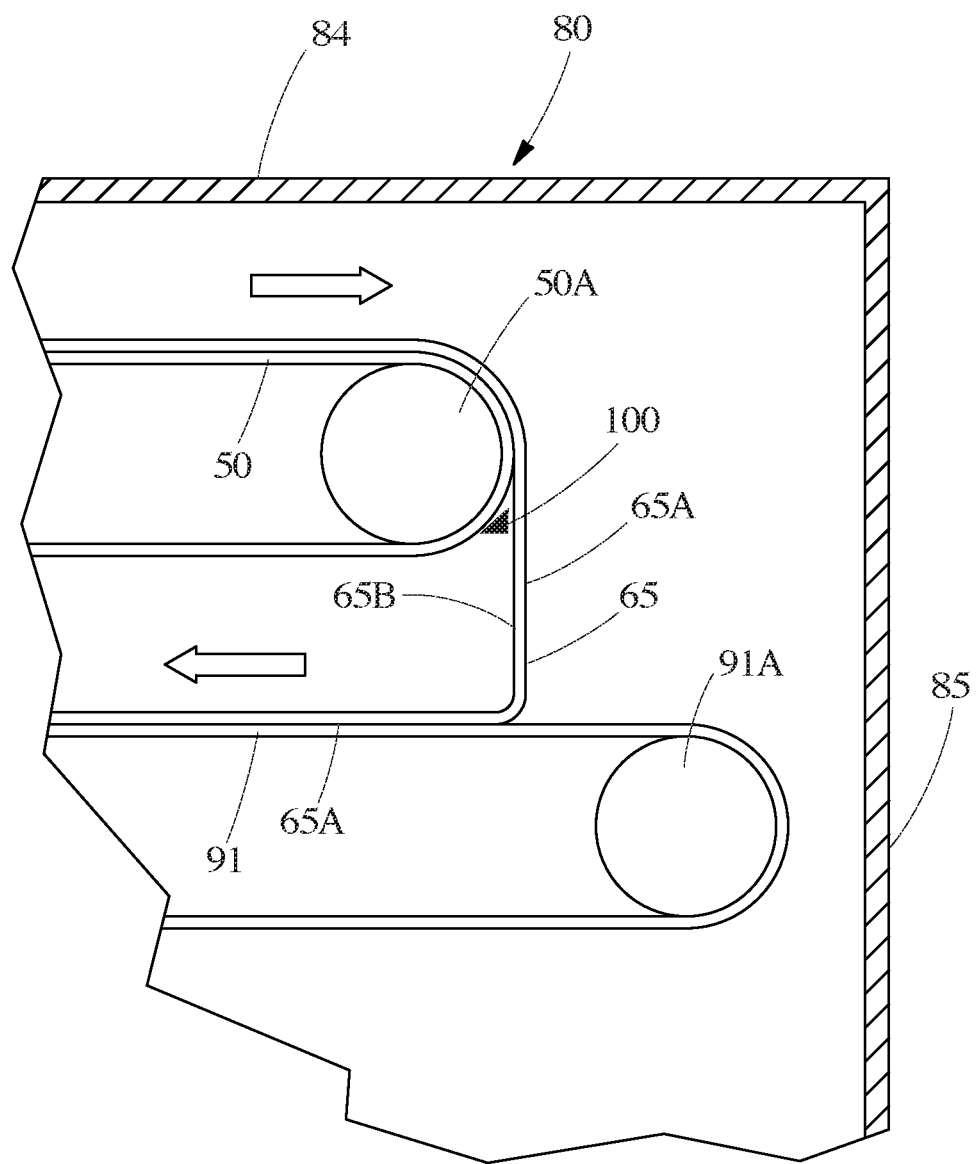
FIG. 4 is a close up cut-away schematic view of a multi-tiered curing oven.
Figure 5:
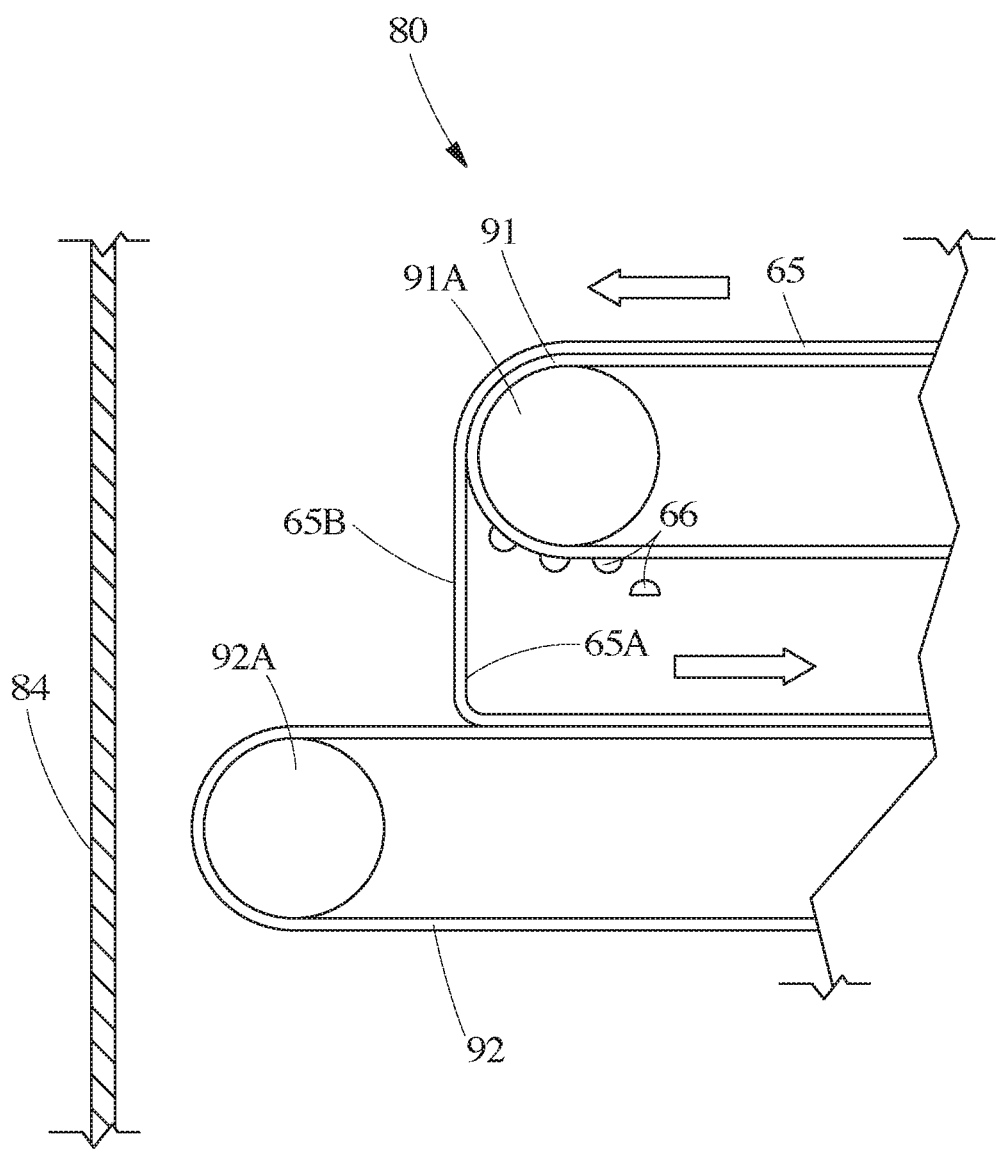
FIG. 5 is a close up cut-away schematic view of a multi-tiered curing oven.

As shown in FIG. 4, which is an enlarged portion of FIG. 3 showing the extrusion belt 50 and oven belt 91, the design of the multi-tiered curing oven 80 allows for more even curing of a HIPE 65 as the HIPE top surface 65A, which is exposed to the heat of the oven environment (the surface not in contact with the extrusion belt 50 as the extrusion belt 50 enters the multi-tiered curing oven 80), changes from belt to belt, as the HIPE 65 is transported downwardly from belt to belt within the multi-tiered curing oven 80. A device 100, such as a brace or blade can be used to help remove the HIPE 65 from a belt so the HIPE 65 can be transported to the next belt. When a HIPE 65 is transferred from one belt to another belt, for example as shown in FIG. 4 from the extrusion belt 50 to oven belt 91, the HIPE 65 surfaces (top 65A and bottom 65B) become reversed, such that the HIPE top surface 65A on one belt (extrusion belt 50) becomes the bottom surface on the next belt (oven belt 91). When the HIPE first enters the multi-tiered curing oven 80 it has undergone only minimal polymerization, such that the HIPE has a gel-like consistency that will easily adhere to most solid surfaces. Therefore when the HIPE 65 is transferred from one belt to another, such as from the extrusion belt 50 to oven belt 91, the formerly top surface 65A now comes into contact with surface of oven belt 91. When the HIPE 65 is transferred from oven belt 91 to oven belt 92, as shown in FIG. 5, the HIPE 65 will leave pieces 66 of itself on the surface of oven belt 91, due to the HIPE's 65 mostly unpolymerized state. These left over HIPE pieces 66 will deform the following HIPE layers transferred to belt 91, and will also fall unto the HIPE 65 on oven belt 92. In the present invention the adherence of the top surface 65A of the HIPE 65 is reduced by exposing the HIPE top surface 65A to UV light before the HIPE 65 enters the multi-tiered curing oven 80. The UV light partially polymerizes the top surface 65A of the HIPE 65 such that when the HIPE 65 is transferred from one belt to another within the multi-tiered curing oven 80 the top surface 65A will not substantially adhere to a belt surface it comes into contact with. This increases both the quantity and quality of the HIPE foam produced and also reduces the amount of down time required in the production of HIPE foam, such as for shutting down the production line to clean the multi-tiered curing oven.

With reference back to FIG. 3, the extrusion belt 50, as it enters the multi-tiered curing oven 80, is covered with a close fitting cover 110. At the curing oven entrance 81, where the extrusion belt 50 enters the multi-tiered curing oven 80, a bottom belt seal 120, which may be constructed of a non-abrasive material such as rubber, contacts the extrusion belt 50 preventing steam from escaping. The multi-tiered curing oven 80 comprises a discharge opening 130 through which the polymerized HIPE foam exits the multi-tiered curing oven 80, and a steam balancing vent 140 powered by a variable speed exhaust fan. The exhaust fan adjusts the pressure pulling the steam out of the discharge opening 130 in order to prevent the steam from naturally rising and exiting from the higher curing oven entrance 81. If the entrance and exit of a curing oven are on the same level, for example if there is only one oven belt, then the steam balancing vent may not be needed.

The multi-tiered curing oven 80, as shown in FIG. 3 has a vent 150, and one or more vent outlets 160 and one or more steam inlets 170. The steam enters the multiple-tier curing oven 80 at the steam inlets 170. Vent outlets 160 may be provided with dampers, valves, or other flow regulating devices which can be adjusted to control the flow path of steam, air and other gases through the multi-tier curing oven 80, and to control the flow rate and pressure drop across the multi-tier curing oven 80. At the floor 82 of the multi-tiered curing oven 80, there is a run-off collector 180, in which excess water, such as that produced by steam condensation is collected and transported out of the multi-tiered curing oven 80.

The monomers present in the HIPE are substantially polymerized in the multi-tiered curing oven 80. Without being bound by theory, it is believed that HIPE foam formation comprises two overlapping processes. These are the polymerization of the monomers and the formation of crosslinks between active sites on adjacent polymer backbones. As used herein the term "polymerize" as in to polymerize monomers to form a HIPE foam encompass both polymerization of monomers and formation of crosslinks between active sites on adjacent polymer backbones. Crosslinking provides HIPE foams with strength and integrity that is helpful to their further handling and use. The current invention involves increasing the overall level of polymerization and cross-linking, thereby reducing the amount of unpolymerized monomer in the HIPE foam. Polymerization can be initiated prior to reaching the multi-tiered curing oven by, for example, by exposing the HIPE to UV light. However, the HIPE is polymerized beyond the point of shapability or moldability in the multi-tiered curing oven— which is when the HIPE is considered a HIPE foam. Heat for the multi-tiered curing oven can be, for example, derived from heat sources located above and below the HIPE or surrounding the HIPE. While FIG. 3 shows the heat for HIPE polymerization being provided by steam, other methods of supplying heat can be used, for example heat can be from forced air ovens, IR heat lamps, microwave, or other suitable source.

In certain embodiments, the temperature may be elevated in a step-wise manner so as to increase the rate of polymerization, initiate drying, or both as the HIPE becomes more completely polymerized. In addition, the curing of the HIPE may be accomplished by passing the web through a hot liquid bath composed of any hot liquid of sufficient temperature to initiate the curing of the monomers. Polymerization temperatures will vary depending on the type of emulsion being cured, the initiator being used, heat source used, and whether or not the multi-tiered curing oven is sealed, but will typically be above 25° C., often above 50° C. In certain embodiments, polymerization temperatures within the multi-tiered curing oven may reach between about 50° C. and 150° C. The HIPE is maintained in the multi-tiered curing oven for a time sufficient to polymerize at least 85%, preferably at least 95% of the monomers in the oil phase of the HIPE. Sufficient polymerization of the HIPE may be controlled by a combination of the initiator used, the temperature of the heat zone, the efficiency of the heat transfer in the heat zone, the rate at which the HIPE goes through the heat zone and the length of the heat zone.

Following polymerization, the resulting HIPE foam is saturated with aqueous phase that needs to be removed to obtain substantially dry HIPE foam. In certain embodiments, HIPE foams can be squeezed free of most of the aqueous phase by using compression, for example by running the HIPE foam through one or more pairs of nip rollers 200. The nip rollers 200 can be positioned such that they squeeze the aqueous phase out of the HIPE foam. The nip rollers 200 can be porous and have a vacuum applied from the inside such that they assist in drawing aqueous phase out of the HIPE foam. In certain embodiments, nip rollers 200 can be positioned in pairs, such that a first nip roller 200 is located above a liquid permeable belt 220, such as a belt 220 having pores or composed of a mesh-like material, and a second opposing nip roller 210 facing the first nip roller 200 and located below the liquid permeable belt 220. One of the pair, for example the first nip roller 200 can be pressurized while the other, for example the second nip roller 210, can be evacuated, so as to both blow and draw the aqueous phase out of the HIPE foam. The nip rollers may also be heated to assist in removing the aqueous phase. In certain embodiments, nip rollers are only applied to non-rigid HIPE foams, that is HIPE foams whose walls would not be destroyed by compressing the HIPE foam. In yet a further embodiment, the surface of the nip rollers may contain irregularities in the form of protuberances, depressions, or both such that a HIPE foam can be embossed as it is moving through the nip rollers. When the HIPE has the desired dryness it may be cut or sliced into a form suitable for the intended application.

In certain embodiments, in place of or in combination with nip rollers, the aqueous phase may be removed by sending the HIPE foam through a drying zone 230 where it is heated, exposed to a vacuum, or a combination of heat and vacuum exposure. Heat can be applied, for example, by running the foam though a forced air oven, IR oven, microwave oven or radiowave oven. The extent to which a HIPE foam is dried depends on the application. In certain embodiments, greater than 50% of the aqueous phase is removed. In certain other embodiments greater than 90%, and in still other embodiments greater than 95% of the aqueous phase is removed during the drying process.

EXAMPLES

Preparation of High Internal Phase Emulsions (HIPE) and their subsequent polymerization into absorbent foams are illustrated in the following example. The HIPE samples comprised two layers—a bottom layer and a top layer, wherein the bottom layer had a smaller average pore size of 30 microns and the top layer had a larger average pore size of about 80 microns.

A. Small Cell Layer Hipe Formation

Small Cell Layer Components:

To prepare the bottom small cell layer of the HIPE the aqueous phase, oil phase, and initiator contained the following components as shown below in Table 1.

TABLE 1

| Oil Phase | % Amount Based on Total Weight of Oil Phase |
| --- | --- |
| 2-ethylhexyl acrylate (EHA) | 37.04% |
| 2-ethylhexyl methacrylate (EHMA) | 37.96% |
| ethyleneglycol dimethacrylate (EGDMA) | 17.59% |
| dimethyl ammonium methyl sulfate (DTDMAMS) | 0.93% |
| Polyglycerol succinate (PGS) | 6.48% |

| Aqueous Phase | % Amount Based on Total Weight of Aqueous Phase |
| --- | --- |
| $CaCl_2$ | 3.85% |
| Water:oil ratio | 26:1 |

| Initiator in Aqueous Solution | % Amount Based on Total Weight of Aqueous Solution |
| --- | --- |
| Potassium Persulfate | 3.50% |
| Water:oil ratio | 1:1 |

Equipment:

The smaller celled emulsion is prepared in equipment comprising static mixers and a recirculation pump. The static mixers are manufactured by Sulzer (Sulzer Ltd. Zürcherstrasse 14, 8401 Winterthur, Switzerland). Forty-eight elements of SMX style mixers, sized to fit within a standard 1.5" diameter pipe were used as the primary mixing loop elements. Four sets of twelve elements welded so that each sequential segment is rotated 90° are fitted into independent sections of pipe fitted with 2" tri-clover quick disconnect piping flanges.

The aqueous phase is introduced into a recirculation loop via a modified 1⅞" tubing 90° elbow with 2" tri-clover quick disconnect piping flanges, with a ½" pipe welded into the elbow to form an annulus such that the aqueous phase is entering the discharge end of the elbow, concurrent with the recirculation flow, both proceeding vertically downward. The end of the annular ½" pipe is internally threaded and a set screw with a 17/64" hole drilled in it to direct the aqueous incoming flow toward the static mixers.

Three sections of the SMX containing pipes, vertically oriented, follow the aqueous introduction elbow. Then the flow is directed by two elbows, both 1⅞" tubing elbows with tri-clover fittings, first a 90° and then a 45°. The final section of SMX mixers is connected upward at a convenient angle to have its discharge at about the same elevation as the inlet fittings to the recirculation pump.

The discharge from the final SMX mixer segment goes through a conical reducer to a ⅞" Tee. (Tee A). One side of the Tee is connected to a same diameter elbow fitted with a temperature probe, which then connects to another ⅞" Tee (Tee B). One side of Tee B connects to a Teflon lined hose 1¼" in diameter and 48" long. The hose connects to the stem side of a ⅞" Tee (Tee C). One side of Tee C's cross piece is connected upwardly to the inlet of the recirculation pump, a Waukesha Model 030 U2 lobe pump (Waukesha Cherry- Burrell Company, Delavan, Wis.). The other side of Tee C's cross piece in connected downwardly to a 7/8" to 5/8" conical reducer. The small end of the conical reducer uses a 3/4" tri-clover connection to a custom made section of 3/8" stainless steel tubing with a 3/4" tri-clover fitting welded onto the tube by first drilling a matching diameter hole in a 3/4" tri-clover end cap. This allows the tube to project into and past the intersection of the stem side of Tee C to the cross piece of Tee C. The end of the tube projecting inward toward the Waukesha pump is internally threaded and fitted with a set screw into which a 7/64" hole has been drilled. The other end of the tube is fitted with a 3/4" tri-clover fitting facing downward fabricated in the same way as mentioned above.

The discharge from the Waukesha pump transfers to a 1 3/8" diameter by 6" spool piece with a small port for a temperature probe and tri-clover sanitary fittings, followed by six elements of 1 1/4" Kenics helical static mixers (Chemineer Inc., Dayton, Ohio) in a section of pipe just long enough to contain them, with ends fitted with tri-clover fittings. Next is a 1 3/8" 90° tubing elbow with tri-clover fittings, a 1 3/8" diameter by 6" spool piece, a second 1 3/8" diameter by 6" spool piece fitted with a means to vent gasses from this, the high spot of the total first stage mixing assembly, and then a 1 3/8 to 1 7/8" conical spool piece connected to the aqueous injector elbow mentioned above. This completes the description of the mixing stage for the small celled emulsion.

It has been found that the supply pumps or the recirculation pump can lead to cyclic pulsations of flow. To mitigate that behavior, the free end of Tee A in the above description can be connected to a surge dampener assembly containing a pressure transducer to monitor pressures and a chamber which can be vented to allow for different volumes of air to be maintained in the chamber in order to dampen the pressure fluctuations.

The discharge from the mixing stage issues from Tee B through a Teflon lined 1 1/4" braided steel hose to a 1" piping elbow fitted with a similar injector tube arrangement to the aqueous injector elbow described above, but with 3/8" tubing instead of 1/2", and fitted with a set screw with a 3/32" drilled hole. The initiator solution is introduced through this arrangement. The discharge of the emulsion and the centrally introduced, collinear initiator stream flow are directed to a series of three segments of twelve elements of SMX mixers sized to fit in a 1" pipe section with tri-clover fittings. The flow then proceeds through a conical reducer into a custom coat hanger style die. The die then deposits the HIPE unto an endless belt moving at a speed of 10 meters per minute.

HIPE Formation:

To start this equipment, aqueous phase is heated to about 80 C and delivered to the aqueous injector point described above at a flow rate of about 2 liters/minute to conveniently fill the equipment and to pre heat the equipment to a temperature indicated by the temperature indicating devices with the loop of about 65 C. The Waukesha pump is started at a theoretical rate of 2 liters per minute when aqueous phase is observed to be coming out of the die, which is higher than the pump, so that the pump is not run dry.

When the equipment temperature is reached, the oil phase is then delivered to the oil phase injector at a rate of 0.5 kilograms/minute. (Aqueous phases are metered in liters per minute and the oil phase is referred to in kilograms per minute in order to describe the theoretical density of the cured emulsion. This also means that one can change the salt concentration or salt type in the aqueous phase and still make the same density product without re-calculating flow rates in kilograms to accomplish the desired product). The water to oil ratio at this stage of startup is then 4:1. After a period of about 5 minutes from the first introduction of oil phase, low viscosity emulsion can be observed issuing from the die. At that point the aqueous temperature setpoint is adjusted to about 72 C and the flow rate is uniformly increased from 2 liters per minute to 8.107 liters per minute over a period of 3 minutes. Only the aqueous phase temperature is controlled, since it is >92% of the total mass of emulsion. The recirculation pump, starting simultaneously with the start of the increase in aqueous phase flow, is uniformly increased in speed to yield a pumping rate of 28 liters per minute over a period of 2 minutes. The oil phase flow, also beginning at the same time as the increase in aqueous phase flow, is decreased uniformly to a flow rate of 0.313 kg/minute over a period of 5 minutes. Sodium acrylate flow at 0.031 liters/minute is comingled with the aqueous flow prior to the introduction to the mixing loop and is generally started during the aqueous flow rate ramp. At equilibrium, the water to oil ratio at the discharge from the recirculation loop is 26:1. The emulsion issuing from the die at the end of the flow ramps is very thick and very white. About 2 minutes after the completion of all of the flow ramps, the initiator is introduced at a flow rate of 0.313 liters per minute, bringing the total water to oil ratio to 27:1. When deposited on the belt that transports the emulsion to the curing chamber with the belt running at 10 meters per minute the resulting layer of emulsion is approximately 2.5 mm thick.

B. Large Cell Layer Hipe Formation

Large Cell Layer Components:

To prepare the top large cell layer of the HIPE the aqueous phase, oil phase, and initiator contained the following components as shown below in Table 2.

TABLE 2

| Oil Phase | % Amount Based on Total Weight of Oil Phase |
|---|---|
| 2-ethylhexyl acrylate (EHA) | 72.02% |
| ethyleneglycol dimethacrylate (EGDMA) | 21.51% |
| dimethyl ammonium methyl sulfate (DTDMAMS) | 0.70% |
| Polyglycerol monoisostearate (PGMIS) | 5.61% |
| Photoinitiator - Darocur 1173* | 0.07% |
| Photoinitiator - Irgacure 184* | 0.07% |

| Aqueous Phase | % Amount Based on Total Weight of Aqueous Phase |
|---|---|
| $CaCl_2$ | 3.85% |
| Water:oil ratio | 22:1 |

| Initiator in Aqueous Solution | % Amount Based on Total Weight of Aqueous Solution |
|---|---|
| Potassium Persulfate | 3.50% |
| Water:oil ratio | 2:1 |

*BASF Corporation, Florham Park, NJ

Equipment:

The larger celled emulsion is prepared in equipment comprising two sets of static mixers and two recirculation pumps in two loop arrangements. The static mixers are manufactured by Sulzer (Sulzer Ltd Zircherstrasse 14, 8401 Winterthur, Switzerland). Forty-eight elements of SMX style mixers, sized to fit within a standard 2" diameter pipe are used as the primary mixing loop elements. Four sets of twelve elements welded so that each sequential segment is rotated 90° are fitted into independent sections of pipe fitted with 2.5" tri-clover quick disconnect piping flanges.

The aqueous phase is introduced into the recirculation loop via a modified 2⅜" tubing 90° elbow with 3" tri-clover quick disconnect piping flanges, with a ½" pipe welded into the elbow to form an annulus such that the aqueous phase is entering the discharge end of the elbow, concurrent with the recirculation flow, both proceeding vertically upward at an angle of about 10° to the horizontal.

The end of the annular ½" pipe is internally threaded and a set screw with a ⅜" hole drilled in it to direct the aqueous incoming flow toward the static mixers. A spool piece, 2⅜" tubing, 6" long, with 3" tri-clover fittings connects the injector elbow to two sections of the SMX containing pipes, oriented upward at about 10° to the horizontal. Then the flow is turned to the reverse by two elbows, both 90° 2⅜" tubing elbows with tri-clover fittings. The final two sections of SMX mixers are connected to a conical adapter that starts at 2⅜" and expands to 2⅞". The conical adaptor connects to the stem end of a 2⅞" tubing Tee (Tee A) fitted with a pressure transducer in the middle of the intersection between the stem and cross piece of the Tee. One side of Tee A connects to a 2⅞" to 1⅜" conical adapter, and then to a 1⅜", 90° elbow, then two 1⅜" 45° elbows. The use of multiple elbows facilitates the fitting together of the large number of piping segments. From the 45° elbows, the flow continues to a 1⅜" diameter, 2" long spool piece, followed by a 1 5/16" diameter, 26¼" spool piece into the stem side of a 1⅜" tubing Tee (Tee B). The upper cross opening of Tee B connects to the oil injector assembly, comprising a 1⅜" to ⅝" conical spool piece connected to an injector similar to the one mentioned above for the smaller celled emulsion oil injector. The lower cross opening of Tee B is attached to a Waukeshaw Model 30 U2 lobe pump. The discharge from the Waukeshaw pump connects to a 1⅜", 90° elbow and then to six elements of Kenics helical static mixers in a 1¼" pipe. A 1⅜", 90° elbow and then a 1⅜", 45° elbow are next, and then another six element section of Kenics helical static mixers in a ¼" pipe. After that, a 1⅜" spool piece with a temperature probe fitting and a 1⅜", 90° elbow and finally a 1⅜" to 2⅜" spool piece connect to the aqueous injector equipped 2⅜" tubing 90° elbow.

The other cross exit of Tee A connects to a cross piece of the secondary aqueous injector Tee, Tee C (2⅞"). The aqueous injector tube, ⅝", enters the top of the Tee directed to be annular to the stem side of the Tee, and is fitted with a set screw drilled with a 5/16" hole. The stem side of Tee C connects to two 2½" standard pipe sections of twelve elements of SMX static mixers, and then to two 2⅞" 90° tubing elbows directing the flow back toward Tee C, but above it due to the approximately 10° upward slant both the outward bound and inward bound piping section have relative to horizontal. This arrangement was chosen to minimize entrained air in the mixers, and avoids the need for venting as is used in the smaller celled emulsion setup. The last two section of 2½" SMX mixers discharge their flow into another 2⅞" tubing Tee equipped with a pressure transducer, again at the intersection of the cross and stem pieces of the Tee, Tee D. One side of the Tee D cross piece connects to a 2⅞" 90° tubing elbow and then into a Waukeshaw Model 130 U2 lobe pump. The lower discharge of the pump connects to a 2⅞" 90° tubing elbow with a temperature probe fitting and connects to the cross piece end of a 2⅞" tubing Tee, Tee E. The other cross piece end of Tee E connects to a cross piece end of Tee C, completing the second mixing stage loop.

The stem side of Tee E connects to 2⅞" to 1⅜" conical reducer and then to a 1⅜" 90° tubing elbow, and then to a surge dampener assembly similar to the one described in the aforementioned small celled emulsion setup. The remaining end of Tee D similarly goes to a 2⅞" 90° tubing elbow and then to a 2⅞" to 1⅜" conical reducer and then to a the cross piece side of a 1⅜" tubing Tee, Tee G. The other cross piece end of Tee G goes to another surge dampener, while the stem side of Tee G goes to a 1⅜"×33" Teflon lined flex hose.

The flex hose connects to the initiator mixer assembly through a 1⅜" 90° tubing elbow equipped with a ⅜" injector tube equipped with a ¼" set screw with a ⅛" hole. The initiator and emulsion are then mixed in forty-eight elements of SMX static mixers sized to fit within a 1.75" diameter pipe. Again, twelve elements are welded together for each of four piping segments. The emulsion then passes through a conical reducer to a coat hanger style die, and the emulsion waterfalls onto the smaller cell sized emulsion passing underneath the die.

HIPE Formation:

To start up the system, aqueous phase is delivered to the first stage injector at a rate of 2 liters per minute at a temperature of about 80 C, and the second injector at a rate of 1 liter per minute at the same temperature. When aqueous phase is observed coming out of the die, which is higher than any of the pumps, the pumps are started. When the internal temperature indicated by the temperature probes all exceed 65 C, the oil phase is introduced to the oil injector at a rate of 0.50 kg/minute. After several minutes, when emulsion is observed issuing from the die, the first aqueous temperature target is shifted to 75 C and the flow rate changed to 2.828 liters per minute uniformly over a time of 3 minutes. At the same time the oil phase flow rate is lowered to 0.202 kg/minute over a period of 5 minutes, the first recirculation pump is increased uniformly to 8 liters per minute over 3 minutes and the sodium acrylate solution feed is started at a flow rate of 0.02 liters per minute, mixing with the aqueous phase prior to introduction into the mixing loop. After the flow rate changes are completed, the second aqueous flow is increased from 1 liter/minute to 1.596 liters per minute over a period of two minutes.

At the completion of the second aqueous flow ramp, the initiator solution is introduced to the initiator injector at a flow rate of 0.404 liters per minute. The emulsion provided to the 0.33 meter wide die is then at an internal phase ratio of 24:1, and the layer thickness when provided on top of the smaller celled emulsion passing by at 10 meters per minute is 1.5 mm.

The polymerization was started by passing the HIPE under a first UV lamp (Model Number XLC250134; Aetek UV Systems, Romeoville, Ill.) equipped with a 25" long 400 Watts/inch medium pressure mercury vapor lamp (Aetek UV Systems; p/n 07-99940). The HIPE then was passed under a second UV lamp (Model Number XLC250134; Aetek UV Systems, Romeoville, Ill.) equipped with a 25" long 400 Watts/inch medium pressure mercury vapor lamp (Aetek UV Systems; p/n 07-99940). Quantitative light measurements for a single pass under the first UV lamp are shown in Table 3 and for the second lamp are shown in Table 4. The measurements were taken with a Power Puck (10 Watt, EIT, Sterling, Va.).

TABLE 3

| First UV Lamp | | |
| --- | --- | --- |
| Spectral Range | Joules/cm$^2$ | Watts/cm$^2$ |
| UVA | 0.47 | 0.56 |
| UVB | 0.37 | 0.43 |
| UVC | 0.07 | 0.08 |
| UVV | 0.27 | 0.29 |

TABLE 4

| Second UV Lamp | | |
| --- | --- | --- |
| Spectral Range | Joules/cm$^2$ | Watts/cm$^2$ |
| UVA | 0.46 | 0.57 |
| UVB | 0.35 | 0.42 |
| UVC | 0.07 | 0.08 |
| UVV | 0.25 | 0.30 |

Following exposure to UV light polymerization, subsequent processing steps included transferring the HIPE to another belt such that the top surface of the HIPE comes in contact with the belt surface of a 3-ply nitrile NBR rubber/spun polyester fabric coated with 0.002" fluorinated ethylene propylene (FEP); (Chemprene Inc., Bacon, N.Y.).

Test Methods

Samples of HIPE were prepared, as described above with some samples exposed to UV light, and examined to determine the level of adherence of the top layer of the HIPE. Samples were visually examined for adherence to the belt surface of a 3-ply nitrile NBR rubber/spun polyester fabric coated with 0.002" fluorinated ethylene propylene (FEP); (Chemprene Inc., Bacon, N.Y.); and tested using the Z-Stick method (described below). Samples were also examined to determine the presence of roll-blocking and pickout. Roll-blocking occurs when a HIPE foam roll cannot be unwound because of the adherence between the opposing surfaces of the HIPE foam resulting in the tearing of the HIPE foam as it is unwound from the roll. Pickout occurs when pieces of the top surface of HIPE foam in a roll adhere to the opposing bottom surface as the HIPE foam is being unwound from a roll. The results are shown in Table 3.

Equipment:

| | |
| --- | --- |
| Tensile Tester | Instron 5564 Constant Rate of Elongation (CRE) load frame (Instron, Norwood, MA), or equivalent having universal constant rate of extension tensile testing machine with computer interface. |
| Load Cell | Instron 100 N load cell (Instron, Norwood, MA), or equivalent (should be capable of handling the 50 N compression stroke yet sensitive enough to capture forces in the 0.01-0.1 N range typically encountered in the separation stroke). |
| Compression Platens | Bottom (stationary) platen may be circular or square (should be minimum of 90 mm diameter for circular platen or 75 × 75 mm for square platen); and top platen (crosshead) should be 50-60 mm diameter circular platen (to accommodate Pyrex dish listed below). |
| Crystallizing dish | Pyrex 70 × 50 mm crystallizing dish (to cover bottom surface of upper compression platen); Chemglass part no. CG-8276-70 (Chemglass Life Sciences, Vineland, NJ). |
| Software | MTS TestWorks 4 software (MTS Systems Corp., Eden Prairie, MN), or equivalent. |
| Tape | 2-sided urethane foam tape, 50.8 mm × 0.79375 mm, 3M grade 4032 (3M, St. Paul, MN). |

Sample Preparation:

Applied a 50.8 mm×50.8 mm piece of 3M grade 4032 2-sided tape to the bottom surface of a sample, such that the axes of the tape correspond to the sample's machine direction (MD) and cross direction (CD).

Trimmed the sample so the edges were flush with the tape edges.

Mounted the sample on the bottom platen with top surface of the sample up, using the 3M grade 4032 2-sided tape to anchor the sample to the bottom platen.

Sample Testing

All Z-Stick measurements were conducted under ambient environmental conditions, standard pressure, and at room temperature of about 20° C. to 25° C.

The terminology and operating parameters listed below are specific to tensile testers, such as the Instron 5564 CRE, using MTS TestWorks operating systems. Minor modifications may be needed to adapt the method for use on tensile testers with operating systems other than MTS TestWorks software.

The Instron 5564 CRE tensile tester was set to the following parameters:

| | |
| --- | --- |
| Pre-load Test Speed (no data) | 12.7 mm/min on compression stroke; |
| Pre-load (no data) | 50 Newtons (N) |
| Pre-test Path (no data) | Down until Force = 50 N, then Stop and Hold for 5 seconds; |
| Test Speed | 25.4 mm/min on separation stroke; |
| Test Path (data collected) | Up until Break Detection; |
| Break Sensitivity | 90% drop from Peak; |
| Break Threshold | 5 g; |
| Data Acquisition Rate | 100 Hz; |
| Measured Variable | Peak Force in N; |
| Gauge Length | None; |
| Slack Compensation | None; |

Before sample testing—the Instron 5564 CRE was calibrated. The Instron 100N load cell internal calibration routine was performed by following the MTS TestWorks 4 software prompts.

Following the internal calibration routine, the load cell function was checked using a 100 g hanging weight. Acceptable values for the 100 g weight were between 98 g and 102 g.

Using the handset and thumbwheel of the Instron 5564 CRE the upper platen was lowered to within 1 cm of touching the top surface of a sample.

The load channel was reset to 0 g.

A sample was then subjected to pressure as the glass-lined upper platen moved downward at 12.7 mm/min until the pressure applied to the sample reached approximately 20 kPa. Once the 20 kPa pressure was reached, the glass-lined upper platen was held in place for five seconds. Following the five seconds the glass-lined upper platen was moved upward at 25.4 mm/min until it separated from the top surface of the sample. As the glass-lined upper platen and the top surface of the sample separated, any resistance of the top surface to release from the glass-lined upper platen was registered by the Instron 100N load cell and the Peak Load reported in units to the nearest 0.01N. Higher Peak Loads correspond to stickier top surfaces and a greater likelihood of those surfaces adhering to an opposing HIPE foam surface. After removal of the sample the glass surface of the glass-lined upper platen was wiped with a paper towel to prevent residue build up, which could interfere with subsequent tests.

TABLE 5

| Sample | UV Exposure* | curing belt adherence | Z-Stick (N) | Roll blocking | pickout |
|---|---|---|---|---|---|
| Sample 1 | yes | no | 0.64 | no | no |
| Sample 2 | no | yes | 1.41 | yes | yes |
| Sample 3 | yes | — | 0.50 | — | — |
| Sample 4 | no | — | 1.19 | — | — |
| Sample 5 | yes | no | 0.60 | no | no |
| Sample 6 | no | Yes | 1.32 | yes | yes |

*To UV lamps 1 and 2
— Not measured

The results in Table 5 show that the HIPE foam samples exposed to UV light (Samples 1, 3 and 5) exhibit a greater degree of polymerization early on in the polymerization process—Samples 1 and 5 did not display noticeable roll blocking or pickout compared to Samples 2 and 6 which did display roll blocking and pickout; and Samples 1, 3 and 5 had lower Z-Stick measurements of 0.64N, 0.50N and 0.60N respectively, than Samples 2, 4 and 6, which were not exposed to UV light and had Z-Stick measurements of 1.41N, 1.19N and 1.32 respectively. The higher levels of adherence exhibited in the samples not exposed to UV light (2, 4 and 6) in the form of belt adherence and high Z-Stick measurements demonstrates a lower degree of polymerization than the samples exposed to UV light (1, 3 and 5). The lack of polymerizations in samples 2, 4 and 6 produces a viscous fluid HIPE sample that is more apt to adhere to belt surfaces, as compared to the more quickly polymerized samples of 1, 3 and 5 which demonstrate less adherence, due to their more fully formed foam structure. As such, the results in Table 3 demonstrate that the methods of exposing HIPEs to UV light, as described herein, successfully reduce the adherence of the HIPE and HIPE foam to the belt surface and successfully reduce the adherence of the foam HIPE to itself.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for polymerizing an open-cell foam comprising:
   exposing a High Internal Phase Emulsion comprising a free-radical initiator to an Ultraviolet light source; and
   partially polymerizing the top surface of the High Internal Phase Emulsion.

2. The method of claim 1, wherein the High Internal Phase Emulsion is moved to a curing oven.

3. The method of claim 1, wherein the High Internal Phase Emulsion is moved to a multi-tiered curing oven.

4. The method of claim 1, wherein the High Internal Phase Emulsion further comprises an oil phase a monomer, a cross-linking agent, an emulsifier and an aqueous phase.

5. The method of claim 1, wherein the UV light is in the wavelength range of from about 200 nm to about 800 nm.

6. The method of claim 1, wherein the source of UV light is a UV lamp.

7. The method of claim 1, wherein the High Internal Phase Emulsion is exposed to the UV light for less than about 1 minute.

8. The method of claim 1, wherein the free-radical initiator is at least one of ammonium persulfate, sodium persulfate, potassium persulfate, 2,2'-azobis(N,N'-dimethyleneisobutyramidine)dihydrochloride, persulfate-bisulfate and persulfate-ascorbic acid.

9. The method of claim 3 wherein the curing oven is a multi-tiered curing oven comprising at least three curing oven belts.

10. The method of claim 1 wherein the top surface has a z-stick measurement of less than 0.70N.

11. The method of claim 1, wherein an aqueous phase and an oil phase of the High Internal Phase Emulsion are combined in a ratio between about 8:1 and about 140:1.

12. The method of claim 1, wherein the High Internal Phase Emulsion is formed by subjecting an aqueous phase and an oil phase to shear agitation.

13. The method of claim 12, wherein the shear agitation is provided by a static mixer.

14. The method of claim 1, wherein the High Internal Phase Emulsion is deposited on an extrusion belt using at least one of a die, sprayer, or caster.

15. The method of claim 14, wherein the extrusion belt is an endless belt.

16. A method for polymerizing a High Internal Phase Emulsion foam comprising:
   depositing a High Internal Phase Emulsion comprising a free-radical initiator on an extrusion belt;
   exposing the emulsion to an Ultraviolet light source; and
   partially polymerizing the top surface of the emulsion.

17. The method of claim 16, wherein the extrusion belt comprises at least one material from the group including films, non-woven materials, woven materials, and combinations thereof.

18. The method of claim 16, wherein extrusion belt comprises depressions, protuberances, or combinations thereof.

19. The method of claim 16, wherein an aqueous phase and an oil phase of the High Internal Phase Emulsion are combined in a ratio between about 8:1 and about 140:1.

20. The method of claim 16, wherein the High Internal Phase Emulsion is formed by subjecting aqueous and oil phases thereof to shear agitation.

\* \* \* \* \*